T. COLE.
Evaporating Pan.
No. 58,220. Patented Sept. 25, 1866.
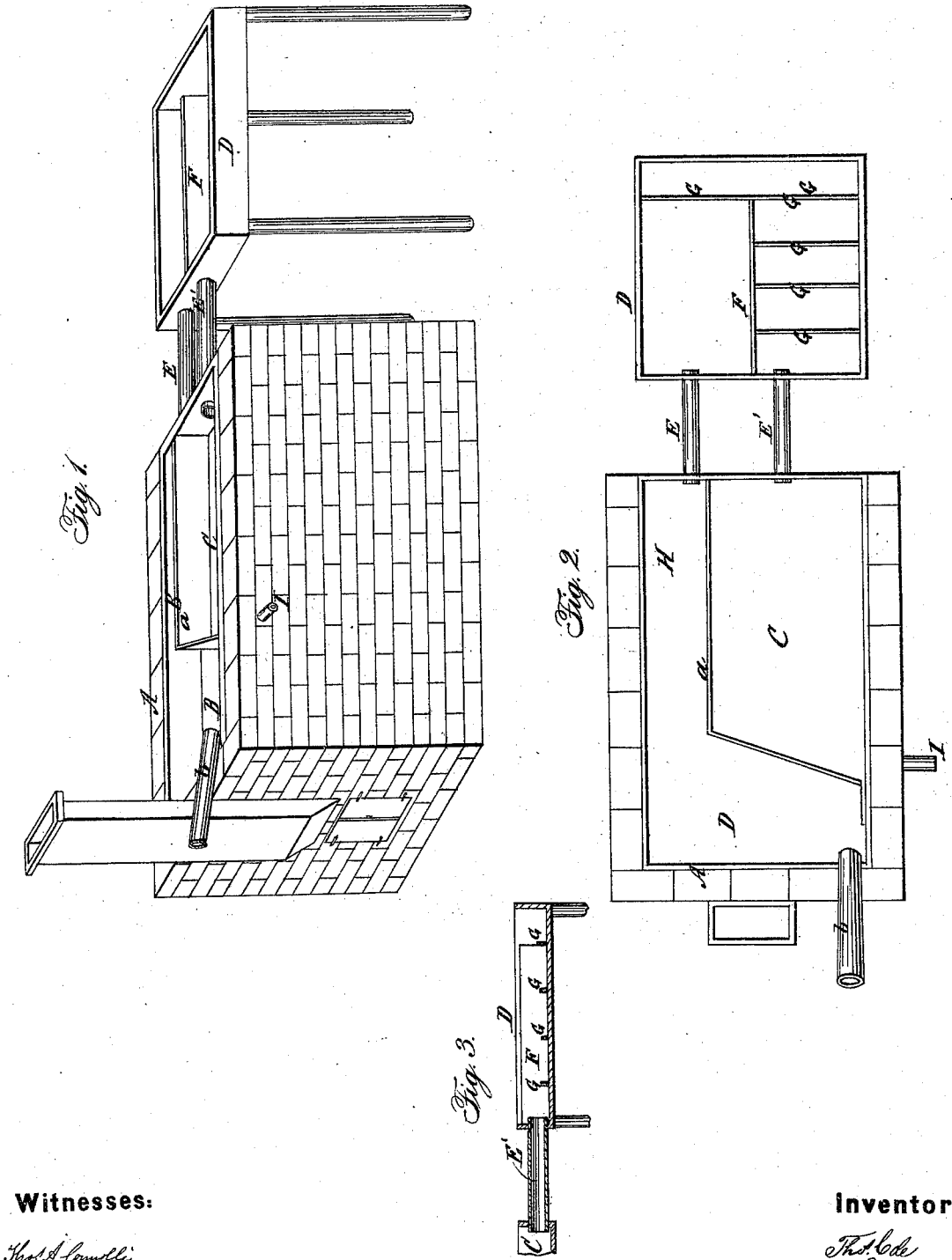

UNITED STATES PATENT OFFICE.

THOMAS COLE, OF CEDAR HILL, OHIO.

IMPROVED SORGHUM - EVAPORATOR.

Specification forming part of Letters Patent No. 58,220, dated September 25, 1866.

*To all whom it may concern:*

Be it known that I, THOMAS COLE, of Cedar Hill, in the county of Fairfield and the State of Ohio, have invented a new and useful Improvement in the Process of Treating the Juice of Sorghum to Reduce it to Sirup, and in the apparatus therefor; and I do hereby declare the following to be a full, clear, and exact description of the same, reference being had to the accompanying drawings, in which—

Figure 1 is a perspective view of my apparatus. Fig. 2 is a plan of the same. Fig. 3 is a vertical longitudinal section of the precipitating-chamber.

The nature of my invention consists, first, in separating those elements which impair the value of the sirup in a more complete manner than heretofore; and, second, in the apparatus by which this is accomplished, and which may be briefly characterized as follows: First, exposure to a high temperature, which rapidly separates those substances which first rise as scum; second, rapid flow into a cool pan, where precipitation of sediment takes place; third, return to a hot pan, when final heating is accomplished and the exit of the substances finally separated prevented by the mechanical action of the boiling liquid.

That others may fully understand my apparatus and its operation, I will describe it.

There appear to be three substances or compounds which must be removed from the juice of sorghum in order to produce sirup of good quality. The first of these is a greenish scum, which readily separates and rises upon the application of heat. This is removed by the ordinary process of skimming. The second is a precipitate, which is deposited upon the bottom of the vessel, and which, if exposed to heat, is liable to become scorched and impart its flavor to the sirup. The third is a waxy or gummy substance, which is the last to separate, but which has a very unpleasant taste, which it imparts to the sirup if not removed.

The object of my invention is to precipitate the second-named substance in a portion of the apparatus, which is not exposed to heat, and therefore in a position where no deleterious effects can follow its presence, and finally to return the sirup, after precipitation has taken place, to a heated pan, where it may be again boiled, and the third substance separated and its exit prevented by the mechanical action of the boiling sirup.

A is the evaporating-pan, divided by the partition *a* into two apartments, B and C.

D is the precipitating-pan, connected to A by two pipes or ducts, E and E'. The partition F divides the pan D in two parts, and the strips or cleats G serve to arrest the current of sirup passing over them, and also to prevent the washing away of precipitated sediment. The partition *a* does not pass from side to side of the pan A, but starting from one side, it crosses in a diagonal direction nearly to the other, and then turns toward the rear end of the pan, running parallel with the sides until it joins the end. This leaves a long narrow passage, H, from the apartment B, at the front end, to the duct E at the rear end of the pan.

I is the exit-pipe, through which the reduced sirup flows when leaving the evaporator.

The pan A may be made in two separate parts, if for any reason it should be deemed desirable.

Operation: The raw juice is introduced at *b*, which is directly over the hottest part of the fire. The green scum rises here quickly; but the juice moves away so rapidly through the passage H and pipe E that the sedimentary portion is not deposited on the surface of A. As the hot juice flows into the precipitating-pan D it spreads out to such an extent that its forward flow is very slow, and the sediment, which has been separated by the action of heat in the apartment B, is deposited and arrested by the cleats G. The pan D is of sufficient size to permit all of the sediment to be deposited before the sirup reaches the pipe E', which will convey it to the apartment C. The sirup, freed from its sediment, is introduced at the coolest end of the apartment C, and flows down toward the exit-pipe I, which is placed at that end of C which is over the fire, where the sirup is caused to boil rapidly. During this operation the third substance is separated and carried to the top and back, toward the entrance, by the mechanical action of the boiling fluid, and the pure sirup, when sufficient evaporation has been secured, is drawn off through the pipe I.

Sorghum sirup is also discolored and rendered dark by long exposure to the surface of hot iron. With my precipitating-chamber it will be evident that the boiling can be accomplished much more rapidly than by any other method, because there will be no fear of scorching the precipitate, and thus injuring the sirup.

With my precipitator, also, a much larger portion of the pan may be kept above the boiling temperature than by any other method, for the same reason; and thus while the boiling may be carried on more rapidly, it may also be extended over a larger surface, and the time of exposure materially shortened.

It is evident that this apparatus may be variously constructed without any substantial difference in its operation, as it may be constructed entirely in one pan with only partitions, or it may be made in three separate parts, and two of them heated over separate fires; but it is evident that such changes of construction will not affect the principle if effecting precipitation at a distance from the fire and discharging the reduced sirup at the hot end of the evaporator, where the mechanical action of boiling will tend to keep back and exclude impurities.

The proper proportions of the several parts of my apparatus are not represented in the drawings.

Having described my process, and the apparatus necessary to carry it into practice, what I claim as new, and desire to secure by Letters Patent, is—

1. The process herein described, whereby the raw juice, after being exposed to a high temperature immediately upon entering the evaporator, is then conveyed away rapidly to a precipitating-chamber not exposed to heat, and finally introduced at the cool end and discharged at the hot end of the chamber, where the final boiling and separation take place, substantially in the manner and with the effect described.

2. In combination with an evaporating-pan, the precipitating-pan D, substantially as and for the purpose described.

3. The evaporating-pan A, divided by the partition a, substantially as and for the purpose described.

4. The evaporating-pan A, constructed with two apartments, in combination with the precipitating-pan D, substantially as and for the purpose described.

THOMAS COLE.

Witnesses:
JESSE LEAHNER,
J. W. TOWSON.